United States Patent
Griesbach et al.

(10) Patent No.: US 12,510,667 B2
(45) Date of Patent: Dec. 30, 2025

(54) INFRARED BEACON FOR LOCATION SHARING

(71) Applicant: Apple Inc., Cupertino, CA (US)

(72) Inventors: Jason S Griesbach, Sausalito, CA (US); Brian M King, Saratoga, CA (US); George Ho Yin Mak, Fremont, CA (US); Pierre P Souloumiac, San Francisco, CA (US); Thayne M Miller, Escondido, CA (US)

(73) Assignee: Apple Inc., Cupertino, CA (US)

( * ) Notice: Subject to any disclaimer, the term of this patent is extended or adjusted under 35 U.S.C. 154(b) by 252 days.

(21) Appl. No.: 18/082,422

(22) Filed: Dec. 15, 2022

(65) Prior Publication Data

US 2023/0221435 A1 Jul. 13, 2023

Related U.S. Application Data

(60) Provisional application No. 63/297,372, filed on Jan. 7, 2022.

(51) Int. Cl.
*G01S 17/06* (2006.01)
*G01S 7/481* (2006.01)
*G01S 7/497* (2006.01)

(52) U.S. Cl.
CPC .............. *G01S 17/06* (2013.01); *G01S 7/4811* (2013.01); *G01S 7/4972* (2013.01)

(58) Field of Classification Search
CPC ....... G01S 17/06; G01S 7/4811; G01S 7/4972
See application file for complete search history.

(56) References Cited

U.S. PATENT DOCUMENTS

| 8,184,983 | B1 * | 5/2012 | Ho ................. H04B 10/1143 |
| | | | 345/8 |
| 8,632,376 | B2 | 1/2014 | Dooley et al. |
| 8,634,848 | B1 | 1/2014 | Bozarth et al. |
| 8,951,128 | B1 | 2/2015 | Farley et al. |
| 9,826,173 | B2 * | 11/2017 | Uosawa ............ H04N 23/611 |
| 10,051,417 | B2 | 8/2018 | Borghei |

(Continued)

FOREIGN PATENT DOCUMENTS

| CA | 2997297 A1 * | 5/2017 | ............ G06F 18/22 |
| CN | 111063066 A | 4/2020 | |

OTHER PUBLICATIONS

English Translation of CN 111063066 (Year: 2020).*

*Primary Examiner* — Patrick N Edouard
*Assistant Examiner* — Eboni N Giles
(74) *Attorney, Agent, or Firm* — Treyz Law Group, P.C.; Joseph F. Guihan; Jinie M. Guihan

(57) ABSTRACT

An electronic device may include an infrared light source and an infrared image sensor to enable infrared beacon functionality. In a location sharing scenario, a first electronic device may use the infrared light source to emit infrared light and serve as an infrared beacon. A second electronic device may use the infrared image sensor to detect the infrared beacon and identify the location of the first electronic device. The infrared image sensor that is used to detect the infrared beacon may also serve as a time-of-flight sensor for a light detection and ranging (LiDAR) module. The second electronic device (that detects the infrared beacon) may provide output such as visual, audio, and/or haptic output to inform a user of the location of the infrared beacon.

19 Claims, 7 Drawing Sheets

(56) References Cited

U.S. PATENT DOCUMENTS

| | | | |
|---|---|---|---|
| 10,095,942 B2 | 10/2018 | Mentese et al. | |
| 10,565,550 B1* | 2/2020 | Gowda | G07G 1/0063 |
| 10,600,235 B2 | 3/2020 | Huston et al. | |
| 10,701,114 B2 | 6/2020 | Ratcliff et al. | |
| 2016/0174272 A1* | 6/2016 | Rabii | H04W 8/005 |
| | | | 455/422.1 |
| 2018/0234795 A1* | 8/2018 | Reitz | H04W 4/023 |
| 2019/0166300 A1* | 5/2019 | Bunker | H04N 23/56 |
| 2020/0239138 A1 | 7/2020 | Raptopoulos et al. | |
| 2020/0337162 A1* | 10/2020 | Perkins | G04G 17/04 |
| 2023/0184944 A1* | 6/2023 | Beaurepaire | G01S 7/4808 |
| | | | 356/3.01 |

\* cited by examiner

INFRARED BEACON FOR LOCATION SHARING

This application claims priority to U.S. provisional patent application No. 63/297,372, filed Jan. 7, 2022, which is hereby incorporated by reference herein in its entirety.

FIELD

This relates generally to electronic devices, and, more particularly, to electronic devices with location sharing capabilities.

BACKGROUND

Electronic devices such as cellular telephones, wristwatches, and other equipment are sometimes provided with means of tracking and sharing position such as Global Positioning System (GPS). Such devices are sufficient for some tasks such as driving, but lack resolution for other tasks such as locating an individual in a crowd. GPS accuracy may be unreliable in indoor settings, and it is sometimes difficult to convert a GPS map to an indoor physical location.

SUMMARY

An electronic device may include an infrared light source and an infrared image sensor to enable infrared beacon functionality. In a location sharing scenario, a first electronic device may use the infrared light source to emit infrared light and serve as an infrared beacon. A second electronic device may use the infrared image sensor to detect the infrared beacon and identify the location of the first electronic device.

The infrared light source that is used as an infrared beacon may also serve as a flood illuminator for a face recognition module. The infrared image sensor that is used to detect the infrared beacon may also serve as a time-of-flight sensor for a light detection and ranging (LiDAR) module.

An electronic device may wirelessly transmit a request for location sharing to an additional electronic device. Upon receiving confirmation that the request for location sharing was accepted, the electronic device may use the infrared image sensor to detect an infrared beacon emitted by the additional electronic device. The electronic device may also use GPS location information received from the electronic device and/or ultra-wideband (UWB) communications exchanged with the additional electronic device to help determine the location of the additional electronic device. The electronic device then provides output such as visual, audio, and/or haptic output to inform a user of the location of the additional electronic device. As one example, the electronic device may display images of the user's surroundings that are updated in real time. The location of the additional electronic device is then identified on the display by an augmentation of the images of the user's surroundings.

An electronic device may receive a request for location sharing from an additional electronic device. Upon receiving authorization for the location sharing from a user, the electronic device may use the infrared light source to emit infrared light (serving as an infrared beacon). The infrared light may be modulated to help distinguish the infrared beacon from any nearby infrared light sources.

DETAILED DESCRIPTION

Electronic devices may include one or more components that may be used to share the location of the electronic device with an additional electronic device. Consider an example where a first person has a cellular telephone. The first person may wish to find a second person (who also has a cellular telephone) in a crowded indoor setting. Technology within the cellular telephones of the first person and the second person may be used to help the first person more easily find the second person.

One type of technology that may be used in this scenario is Global Positioning System (GPS) technology. The second person may share their location (as determined by GPS) with the first person. The cellular telephone of the first person may display the location of the second person on a map of the first person's surroundings. In some scenarios, this technique may work as intended to help the first person find the second person. However, if the second person is indoors, the second person's shared GPS location may not be sufficiently accurate for the first person to easily find the second person. Additionally, it may be difficult for the first person to convert the GPS map view on their cellular telephone to an actual physical location of the second person.

Location sharing may therefore be improved by providing infrared beacon functionality in the cellular telephones of the first person and the second person. When the second person shares their location with the first person, the second person's cellular telephone may emit infrared light. The infrared light is not visible to the first or second person and therefore is not disruptive to any people in the area. The first person may hold their cellular telephone to face the general direction of the second person. An infrared image sensor in the first person's cellular telephone is used to detect the infrared light emitted from the second person's cellular telephone (and, correspondingly, the second person's location). The first person's cellular telephone then displays an image (or provides other output) that identifies the location of the second person. The displayed image may highlight the second person's location through an increased brightness (e.g., spotlight) at the second person's location, a visual indicator (e.g., an arrow or circle) at the second person's location, etc.

Figure 1:
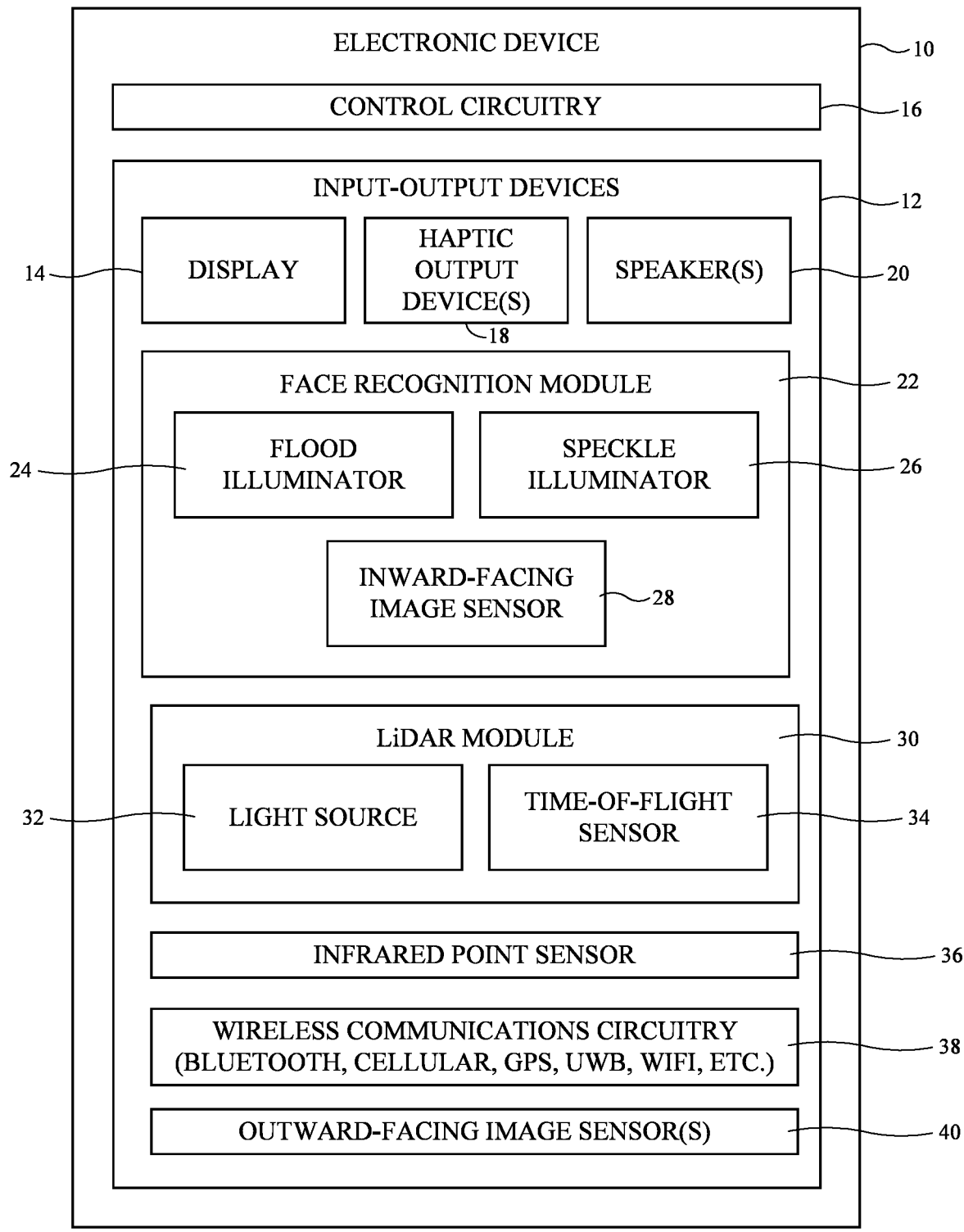
FIG. 1 is a schematic diagram of an illustrative electronic device in accordance with an embodiment.

A schematic diagram of an illustrative electronic device of the type that may be provided with infrared beacon functionality is shown in FIG. 1. Electronic device 10 may be a computing device such as a laptop computer, a computer monitor containing an embedded computer, a tablet computer, a cellular telephone, a media player, or other handheld or portable electronic device, a speaker (e.g., a voice-controlled assistant or other suitable speaker), a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Device 10 may have input-output circuitry such as input-output devices 12. Input-output devices 12 may include user input devices that gather user input and output components that provide a user with output. Devices 12 may also include communications circuitry that receives data for device 10 and that supplies data from device 10 to external devices. Devices 12 may also include sensors that gather information from the environment.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may be a liquid crystal display, a light-emitting diode display (e.g., an organic light-emitting diode display), an electrophoretic display, or other display.

Input-output devices 12 may include additional output devices such as one or more haptic output devices 18 and one or more speakers 20. Haptic output devices 18 may be used for generating vibrations and/or other haptic (tactile) output. Speakers 20 may be used to play audio for the user.

Input-output devices 12 include a face recognition module 22 with a flood illuminator 24, a speckle illuminator 26, and an inward-facing image sensor 28. Inward-facing image sensor 28 may be positioned to capture images in front of electronic device 10. For example, the image sensor may be positioned to capture images of the user (e.g., the user's face) while the user views display 14 and operates electronic device 10. Inward-facing image sensor 28 (sometimes referred to as image sensor 28, infrared image sensor 28, infrared light detector 28, etc.) may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. Inward-facing image sensor 28 may detect light at an infrared wavelength such as a wavelength in the range of 800-1100 nanometers (e.g., 940 nanometers). In some embodiments, the face recognition module may include more than one image sensor to capture multiple types of images (e.g., both an infrared image sensor and a visible light sensor that senses red, blue, and green light may be included).

Illuminators 24 and 26 may be used for illuminating surfaces (or subjects) with different types of light detected by inward-facing image sensor 28. Flood illuminator 24 may include an infrared light source (e.g., a laser, lamp, infrared light-emitting diode, an array of vertical-cavity surface-emitting lasers (VCSELs), etc.). The flood illuminator may provide constant and/or pulsed illumination at an infrared wavelength such as a wavelength in the range of 800-1100 nanometers (e.g., 940 nanometers). For example, flood illuminator 24 may provide flood infrared (IR) illumination to flood a subject with IR illumination (e.g., an IR flashlight) . The flood infrared illumination comprises diffused infrared light that uniformly covers a given area. Inward-facing image sensor 28 may capture images of the flood IR illuminated subject. The captured images may be, for example, two-dimensional images of the subject illuminated by IR light.

Speckle illuminator 26 may include an infrared light source (e.g., a laser, lamp, infrared light-emitting diode, an array of vertical-cavity surface-emitting lasers (VCSELs), etc.). The speckle illuminator may provide constant and/or pulsed illumination at an infrared wavelength such as a wavelength in the range of 800-1100 nanometers (e.g., 940 nanometers). For depth detection or generating a depth map image, speckle illuminator 26 may provide IR illumination with a speckle pattern. The speckle pattern (sometimes referred to as structured light) may be a pattern of collimated light spots (e.g., a pattern of dots) with a known, and controllable, configuration and pattern projected onto a subject. Speckle illuminator 26 may include a vertical-cavity surface-emitting laser (VCSEL) array configured to form the speckle pattern or a light source and patterned layer configured to form the speckle pattern. The configuration and pattern of the speckle pattern provided by speckle illuminator 26 may be selected, for example, based on a desired speckle pattern density (e.g., dot density) at the subject. Inward-facing image sensor 28 may capture images of the subject illuminated by the speckle pattern. The captured image of the speckle pattern on the subject may be assessed (e.g., analyzed and/or processed) by an imaging and processing system (ISP) to produce or estimate a three-dimensional map of the subject (e.g., a depth map or depth map image of the subject).

In some embodiments, inward-facing image sensor 28 and illuminators 24 and 26 are included in a single chip package. In some embodiments, inward-facing image sensor 28 and illuminators 24 and 26 are located on separate chip packages.

The example of FIG. 1 where face recognition module 22 includes a separate flood illuminator 24 and speckle illuminator 26 is merely illustrative. In another possible arrangement, a switchable light source may have a first mode in which flood illumination is emitted and a second mode in which a speckle pattern is emitted.

The components of face recognition module 22 (i.e., flood illuminator 24, speckle illuminator 26, and inward-facing image sensor 28) may be used to confirm whether or not a user is an authorized user of the electronic device. For example, control circuitry 16 within the electronic device may unlock the electronic device if face recognition module 22 confirms the person viewing the electronic device is an authorized user for the electronic device. Control circuitry 16 within the electronic device may not unlock the electronic device if face recognition module 22 determines that the person viewing the electronic device is not an authorized user for the electronic device.

In addition to face recognition module 22, input-output devices 12 may include a light detection and ranging (Li-DAR) module 30. LiDAR module 30 may be used to more precisely determine the distance from device 10 to an imaged object. LiDAR module 30 may include a light source 32 and a time-of-flight sensor 34. Light source 32 may be an infrared light source that provides light at an infrared wavelength such as a wavelength in the range of 800-1100 nanometers (e.g., 940 nanometers). The light source may be a laser such as a vertical-cavity surface-emitting lasers (VCSEL). The light source may emit coherent or incoherent light.

During operation of LiDAR module 30, light source 32 may emit pulses of light at known times. The light from the light source reflects off a subject and is detected by time-of-flight sensor 34. The time between the emission of a pulse of light and detection of that pulse of light by the time-of-light image sensor is used to depth map the imaged scene. Time-of-flight sensor 34 (sometimes referred to as outward-facing image sensor 34, image sensor 34, sensor 34, time-of-flight image sensor 34, etc.) may include an array of imaging pixels and associated readout circuitry. The number of readout circuits in time-of-flight sensor 34 may be less than the number of pixels. Multiplexing circuitry may be included in the sensor to selectively readout subsets of the pixels in time-of-flight sensor 34. For example, the time-of-flight sensor may include 20,000 imaging pixels and 500 readout circuits. A first subset of 500 pixels is read out using the 500 readout circuits, then a second subset of 500 pixels is read out using the 500 readout circuits, etc. This example is merely illustrative. In general, the time-of-flight sensor may include any desired number of pixels and any desired number of readout circuits.

The electronic device may also include infrared point sensor 36. Infrared point sensor 36 may be an outward-facing optical sensor that measures infrared light levels at a single point. Infrared point sensor 36 (sometimes referred to as outward-facing infrared point sensor 36, outward-facing optical sensor 36, etc.) may be used to detect flickering infrared light, changes in ambient infrared light, etc.

Input-output circuitry 12 may include wireless communications circuitry 38 for wirelessly conveying radio-frequency signals. While control circuitry 16 is shown separately from wireless communications circuitry 38 in the example of FIG. 1 for the sake of clarity, wireless communications circuitry 38 may include processing circuitry that forms a part of control circuitry 16 and/or storage circuitry that forms a part of control circuitry 16 (e.g., portions of control circuitry 16 may be implemented on wireless communications circuitry 38). As an example, control circuitry 16 may include baseband processor circuitry or other control components that form a part of wireless communications circuitry 38.

Wireless communications circuitry 38 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. The radio-frequency transceiver circuitry may be used for handling transmission and/or reception of radio-frequency signals within corresponding frequency bands at radio frequencies (sometimes referred to herein as communications bands or simply as "bands"). The frequency bands handled by wireless communications circuitry 38 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz), 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz, near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, ultra-wideband (UWB) frequency bands that operate under the IEEE 802.15.4 protocol and/or other ultra-wideband communications protocols (e.g., a first UWB communications band at 6.5 GHz and/or a second UWB communications band at 8.0 GHz), communications bands under the family of 3GPP wireless communications standards, communications bands under the IEEE 802.XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless communication circuitry 38 may also be used to perform spatial ranging operations if desired.

The UWB communications handled by wireless communication circuitry 38 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Wireless communication circuitry 38 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). The radio-frequency transceiver circuitry may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, wireless communications circuitry 38 may cover (handle) any desired frequency bands of interest. The wireless communication circuitry 38 also may include antennas that are used to convey radio-frequency signals. The term "convey radio-frequency signals" as used herein means the transmission and/or reception of the radio-frequency signals (e.g., for performing unidirectional and/or bidirectional wireless communications with external wireless communications equipment). Antennas may transmit the radio-frequency signals by radiating the radio-frequency signals into free space (or to freespace through intervening device structures such as a dielectric cover layer). The antennas may additionally or alternatively receive the radio-frequency signals from free space (e.g., through intervening devices structures such as a dielectric cover layer). The transmission and reception of radio-frequency signals by the antennas each involve the excitation or resonance of antenna currents on an antenna resonating element in the antenna by the radio-frequency signals within the frequency band(s) of operation of the antenna.

Antennas in wireless communication circuitry 38 may be formed using any suitable antenna types. For example, the antennas may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc.

Input-output devices 12 also include an outward-facing image sensor 40 (sometimes referred to as image sensor 40, visible light image sensor 40, visible light detector 40, etc.). The outward-facing image sensor 40 may be, for example, an array of sensors (imaging pixels). Sensors in the sensor array may include, but not be limited to, charge coupled device (CCD) and/or complementary metal oxide semiconductor (CMOS) sensor elements to capture visible light images (e.g., visible light at a wavelength in the range of 400-700 nm).

In addition to the input-output devices 12 explicitly shown in FIG. 1, input-output devices 12 may include buttons, joysticks, scrolling wheels, touch pads, key pads, keyboards, microphones, tone generators, additional cameras, light-emitting diodes and other status indicators, non-optical sensors (e.g., temperature sensors, capacitive touch sensors, force sensors, gas sensors, pressure sensors, sensors that monitor device orientation and motion such as inertial measurement units formed from accelerometers, compasses, and/or gyroscopes), data ports, etc. A user can control the operation of device 10 by supplying commands through input-output devices 12 and may receive status information and other output from device 10 using the output resources of input-output devices 12.

One or more of the components shown in FIG. 1 may be omitted from electronic device 10 if desired.

Figure 2:
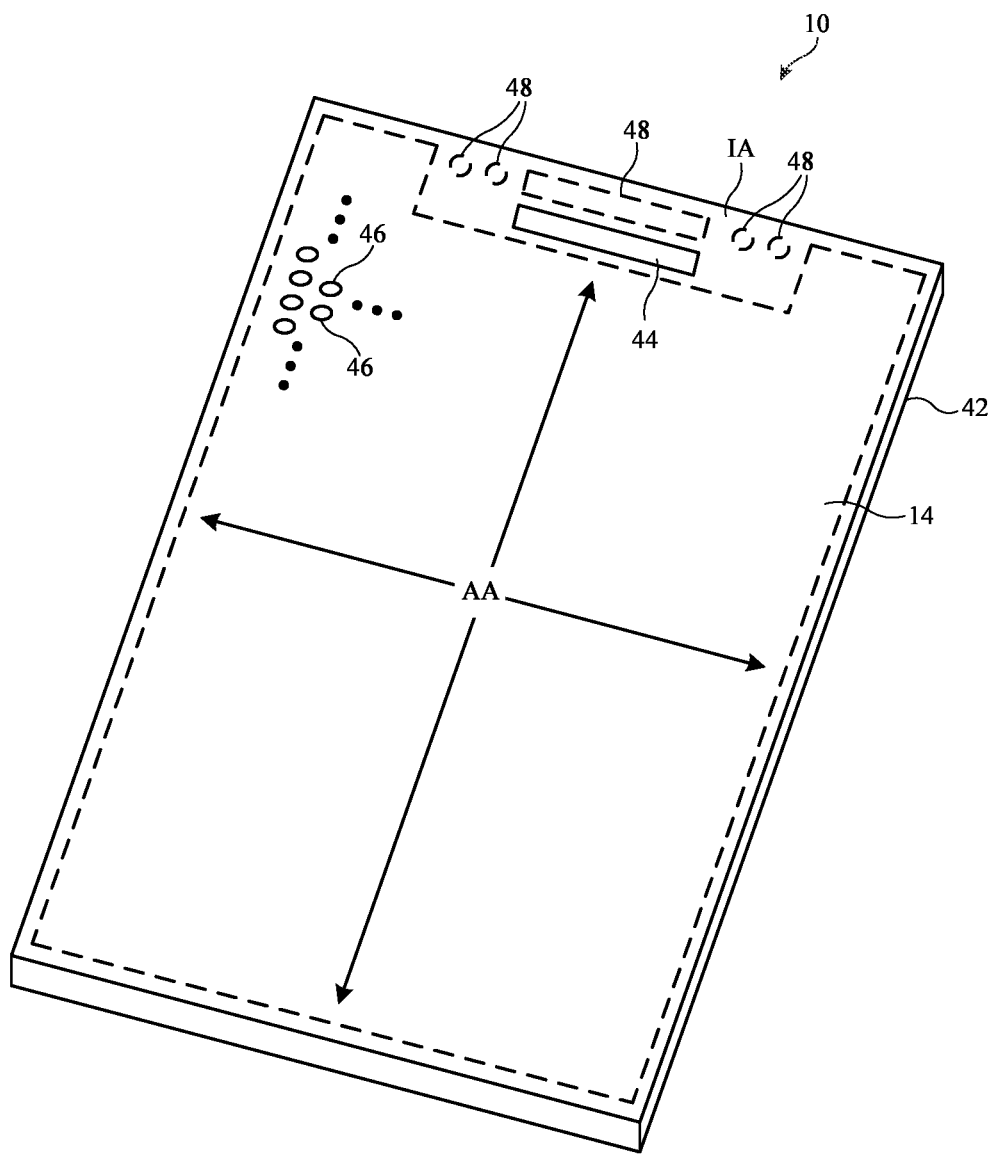
FIG. 2 is a perspective front view of an illustrative electronic device with a display having optical component windows overlapping optical components in accordance with an embodiment.

Device 10 may have a housing. The housing may form a laptop computer enclosure, an enclosure for a wristwatch, a cellular telephone enclosure, a tablet computer enclosure, or other suitable device enclosure. A perspective view of a front portion of an illustrative electronic device is shown in FIG. 2. In the example of FIG. 2, device 10 includes a display such as display 14 mounted in housing 42 at a front face of the device. Housing 42, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 42 may be formed using a unibody configuration in which some or all of housing 42 is machined or molded as a single structure or may be formed using multiple structures (e.g., an internal frame structure, one or more structures that form exterior housing surfaces, etc.). Housing 42 may have any suitable shape. In the example of FIG. 2, housing 42 has a rectangular outline (footprint when viewed from above) and has four peripheral edges (e.g., opposing upper and lower edges and opposing left and right edges). Sidewalls may run along the periphery of housing 42. If desired, a strap may be coupled to a main portion of housing 42 (e.g., in configurations in which device 10 is a wristwatch or head-mounted device).

Display 14 may be protected using a display cover layer such as a layer of transparent glass, clear plastic, sapphire, or other clear layer (e.g., a transparent planar member that forms some or all of a front face of device 10 or that is mounted in other portions of device 10). Openings may be formed in the display cover layer. For example, an opening may be formed in the display cover layer to accommodate a button, a speaker port such as speaker port 44, or other components. Openings may be formed in housing 42 to form communications ports (e.g., an audio jack port, a digital data port, etc.), to form openings for buttons, etc. In some configurations, housing 42 may have a rear housing wall formed from a planar glass member or other transparent layer (e.g., a planar member formed on a rear face of device 10 opposing a front face of device 10 that includes a display cover layer).

Display 14 may have an array of pixels 46 in active area AA (e.g., liquid crystal display pixels, organic light-emitting diode pixels, electrophoretic display pixels, etc.). Pixels 46 of active area AA may display images for a user of device 10. Active area AA may be rectangular, may have notches along one or more of its edges, may be circular, may be oval, may be rectangular with rounded corners, and/or may have other suitable shapes.

Inactive portions of display 14 such as inactive border area IA may be formed along one or more edges of active area AA. Inactive border area IA may overlap circuits, signal lines, and other structures that do not emit light for forming images. To hide inactive circuitry and other components in border area IA from view by a user of device 10, the underside of the outermost layer of display 14 (e.g., the display cover layer or other display layer) may be coated with an opaque masking material such as a layer of black ink (e.g., polymer containing black dye and/or black pigment, opaque materials of other colors, etc.) and/or other layers (e.g., metal, dielectric, semiconductor, etc.). Opaque masking materials such as these may also be formed on an inner surface of a planar rear housing wall formed from glass, ceramic, polymer, crystalline transparent materials such as sapphire, or other transparent material.

In the example of FIG. 2, speaker port 44 is formed from an elongated opening (e.g., a strip-shaped opening) that extends along a dimension parallel to the upper peripheral edge of housing 42. A speaker may be mounted within device housing 42 in alignment with the opening for speaker port 44. Input-output components such as optical components (that either emit or receive light) may be mounted under one or more optical component windows such as optical component windows 48. In the example of FIG. 2, four of windows 48 have circular outlines (e.g., circular footprints when viewed from above) and one of windows 48 has an elongated strip-shaped opening (e.g., an elongated strip-shaped footprint when viewed from above). If desired, windows such as optical windows 48 may have shapes other than circular and rectangular shapes. The examples of FIG. 2 are merely illustrative.

Optical component windows such as windows 48 may be formed in inactive area IA of display 14 (e.g., an inactive border area in a display cover layer such as an inactive display region extending along the upper peripheral edge of housing 42) or may be formed in other portions of device 10 such as portions of a rear housing wall formed from a transparent member coated with opaque masking material, portions of a metal housing wall, polymer wall structures, etc. In the example of FIG. 2, windows 48 are formed adjacent to the upper peripheral edge of housing 42 between speaker port opening 44 in the display cover layer for display 14 and the sidewall along the upper edge of housing 42. In some configurations, an opaque masking layer is formed on the underside of the display cover layer in inactive area IA and optical windows 48 are formed from openings within the opaque masking layer. To help optical windows 48 visually blend with the opaque masking layer, a dark ink layer, a metal layer, a thin-film interference filter formed from a stack of dielectric layers, and/or other structures may be overlap windows 48.

Figure 3:
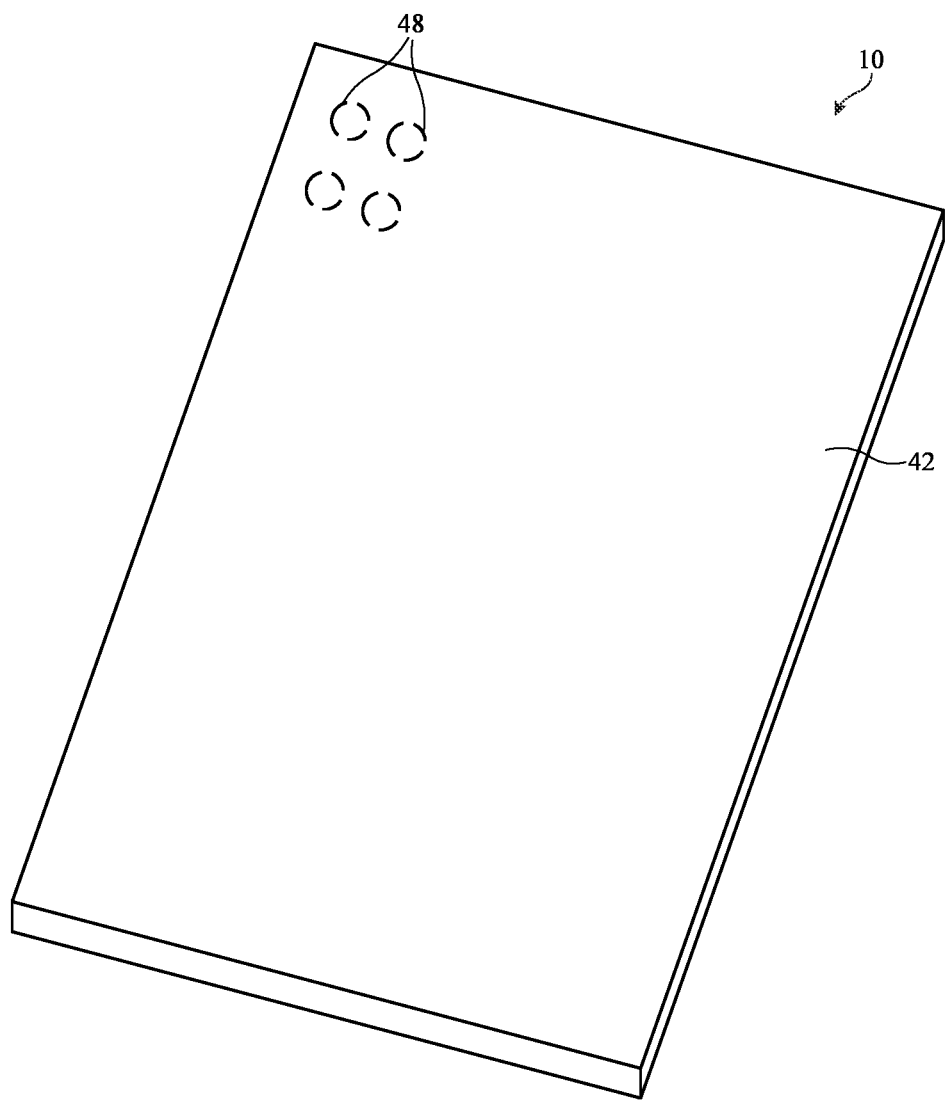
FIG. 3 is a perspective rear view of an illustrative electronic device with a rear housing surface having optical component windows overlapping optical components in accordance with an embodiment.

A perspective view of a rear portion of an illustrative electronic device is shown in FIG. 3. In the example of FIG. 3, device 10 includes a rear housing wall at a rear face of the device. Housing 42 may have a rear housing wall formed from a planar glass member or other transparent layer (optionally covered by an opaque masking layer), from a metal layer, from a plastic layer, etc. One or more of the optical component windows 48 may be formed in the rear housing wall.

Each optical component window 48 in FIGS. 2 and 3 may overlap one or more optical components. For example, flood illuminator 24, speckle illuminator 26, and inward-facing image sensor 28 all may be aligned with optical components windows 48 on the front face of the device (in FIG. 2). Light source 32, time-of-flight sensor 34, infrared point sensor 36, and outward-facing image sensor 40 all may be aligned with optical components windows 48 on the rear face of the device (in FIG. 3).

During operation, electronic device 10 may be used for location sharing operations that involve an infrared beacon. Consider a scenario where user 1 with device 1 is trying to locate user 2 with device 2. Device 2 may emit infrared light while device 1 scans the surroundings using an infrared image sensor. The infrared image sensor in device 1 locates the infrared light emitted by device 2. Device 1 may use output components to provide feedback to user 1 regarding the location of device 2 (and, correspondingly, user 2).

For this type of location sharing (sometimes referred to as friend-finding) operation, the device being found (e.g., device 2 in the example above) needs an infrared light source and the device doing the finding (e.g., device 1 in the example above) needs an infrared image sensor. Electronic devices such as device 10 in FIG. 1 may include both an infrared light source and an infrared image sensor to enable the device to serve both the roles of the device being found and the device doing the finding.

If desired, electronic device 10 may include a dedicated infrared light source and a dedicated infrared image sensor for the friend-finding operations. Alternatively, optical components used for additional applications within the electronic device may also be used for the friend-finding operations. For example, flood illuminator 24 in electronic device 10 may be used in face recognition module 22, as described in connection with FIG. 1. Flood illuminator 24 may also be used to emit infrared light (e.g., serve as an infrared beacon) during friend-finding operations. Time-of-flight sensor 34 in electronic device 10 may be used in LiDAR module 30, as described in connection with FIG. 1. Time-of-flight sensor 34 may also be used as an infrared image sensor during friend-finding operations (e.g., for locating an infrared beacon).

Figure 4:
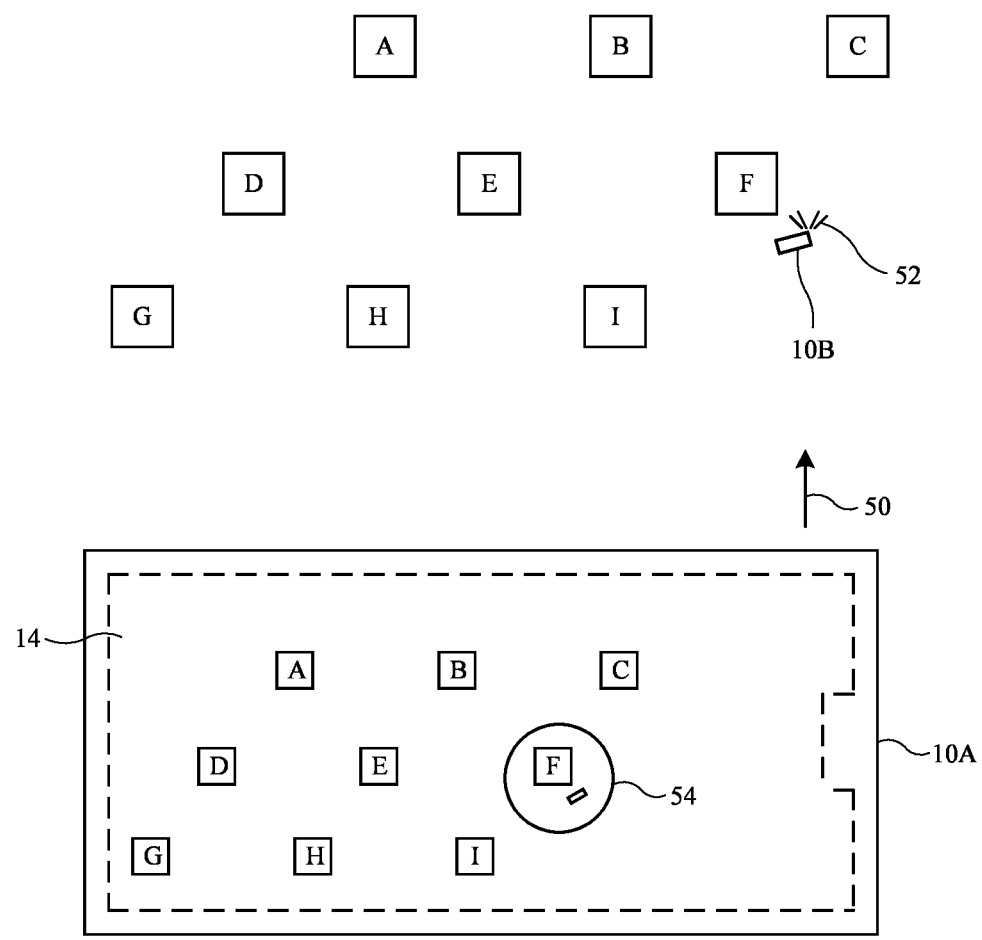
FIG. 4 is a diagram of an illustrative infrared beacon system where a first electronic device locates a second electronic device that emits an infrared beacon in accordance with an embodiment.

FIG. 4 is a diagram illustrating how an infrared beacon may be used for location sharing. In the example of FIG. 4, electronic device 10A is used to locate electronic device 10B (e.g., a cellular telephone, a tablet computer, a wristwatch device, a device embedded in eyeglasses or other equipment worn on a user's head, an embedded system such as a system in which electronic equipment is mounted in a kiosk or automobile, etc.). As shown, there may be a number of points of interest A, B, C, D, E, F, G, H, and I in the surroundings of electronic device 10A. The points of interests may be people (e.g., people in a crowded indoor setting), cars (e.g., a number of cars on the street in a pickup area), etc. The user of device 10A may wish to find device 10B (and its corresponding user). Accordingly, device 10A transmits a location sharing request to device 10B. When the user of device 10B accepts the location sharing request, device 10B uses in an infrared light source such as flood illuminator 24 to emit infrared light 52. Using infrared light makes the light invisible to both users and any other people nearby, minimizing disruption to the area.

The user of device 10A may hold the device to face the general direction of device 10B. An outward-facing image sensor such as outward-facing image sensor 40 in FIG. 1 points in direction 50 towards points of interest A-I. The images captured by the outward-facing image sensor may be displayed in real time on display 14. In other words, outward-facing image sensor 40 serves as a pass-through camera that allows the user of device 10A to see their real world surroundings on display 14.

Simultaneously with the outward-facing image sensor 40, an infrared image sensor in device 10A such as time-of-flight sensor 34 in FIG. 1 points in direction 50 and captures images of the user's surroundings. The infrared image sensor in device 10A captures images of infrared light 52 emitted by device 10B (thus providing information regarding the location of device 10B). This information regarding the location of device 10B may be output using device 10A.

In the example of FIG. 4, the image of the real world on display 14 of device 10A is augmented to highlight the location of device 10B. In FIG. 4, device 10B is closest to point of interest F. The location of device 10B nearby point of interest F is therefore augmented using augmentation 54. The augmentation may be, for example, an identifying marker such as a circle or arrow that highlights the location of device 10B and/or the point of interest (e.g., the person or car) near device 10B. As another example, the augmentation may be an increased brightness in the area around device 10B and/or the point of interest near device 10B.

Both the image on display 14 (from the outward-facing image sensor 40) and the augmentation to the image (as determined using infrared image data from time-of-flight sensor 34) may be updated in real time. The user of device 10A may pan device 10A around their surroundings. The pass-through image on display 14 is updated in real time to reflect the direction of device 10A. Augmentation 54 may remain fixed on device 10B even if device 10A pans from side-to-side, causing the position of augmentation 54 to move across display 14.

The infrared light source in device 10B therefore serves as an infrared beacon to help device 10A locate device 10B. There are many possible use cases for infrared beacons of this type. First, consider an example where user A of device 10A is trying to find user B of device 10B. User B may already be seated in a crowded restaurant, for example. User A enters the restaurant and needs to locate user B. Users A and B may enable location sharing with an infrared beacon. Device 10B emits infrared light to serve as the infrared beacon. User A holds device 10A up and scans the restaurant with outward-facing image sensor 40 while viewing display 14 on the front face of device 10A. The images of the restaurant captured by the outward-facing image sensor are displayed in real time on device 10A's display, with ongoing updates to reflect the direction device 10A is being pointed. As device 10A scans the restaurant, an outward-facing infrared image sensor in device 10A (e.g., time-of-flight sensor 34) captures images of device 10A's surroundings. In some cases, device 10B may not be in the field-of-view of device 10A. In this case, the images from the outward-facing image sensor 40 are displayed in real time on display 14 without augmentation. Optionally, feedback (e.g., text on display 14, audio feedback, etc.) may be provided indicating that the target device is not currently visible. When device 10B (and infrared light 52) are in the field-of-view of device 10A, the images from the outward-facing image sensor 40 are augmented to highlight the position of device 10B. In this way, the position of device 10B is shown in an intuitive manner to user A of device 10A.

Consider another example where user A of device 10A is being picked up from an airport using a ride-sharing application. User A may be in a designated pickup area that is crowded with both other people (waiting for their rides) and other cars. User A may receive a written description of their assigned car from their ride-sharing application. However, it still may be difficult to pick out the correct car from the multitude of cars in the pickup area. To make it easier to find the correct car, user A may send a location sharing request to their assigned car. After the driver of the assigned car accepts the request, an infrared light source on or in the car emits infrared light (serving as an infrared beacon). User A holds device 10A up and scans the designated pickup area with outward-facing image sensor 40 while viewing display 14 on the front face of device 10A. The images of the designated pickup area captured by the outward-facing image sensor are displayed in real time on device 10A's display, with ongoing updates to reflect the direction device 10A is being pointed. As device 10A scans the designated pickup area, an outward-facing infrared image sensor in device 10A (e.g., time-of-flight sensor 34) captures images of the surroundings. In some cases, user A's assigned car may not be in the field-of-view of device 10A. In this case, the images from the outward-facing image sensor 40 are displayed in real time on display 14 without augmentation. Optionally, feedback (e.g., text on display 14, audio feedback, etc.) may be provided indicating that the target car is not currently visible. When the user's assigned car (and the infrared light emitted by a light source on or in the car) is in the field-of-view of device 10A, the images from the outward-facing image sensor 40 are augmented to highlight the position of the user's assigned car. In this way, the position of the user's assigned car is shown in an intuitive manner to user A of device 10A.

It should be noted that the infrared beacon from device 10B may be detected by device 10A even if there is no direct line-of-sight to device 10B from device 10A. The infrared light emitted by device 10B may be visible to device 10A even if device 10B is itself blocked. The infrared beacon may therefore serve as an effective location sharing method even in certain scenarios with no direct line-of-sight.

Figure 5:
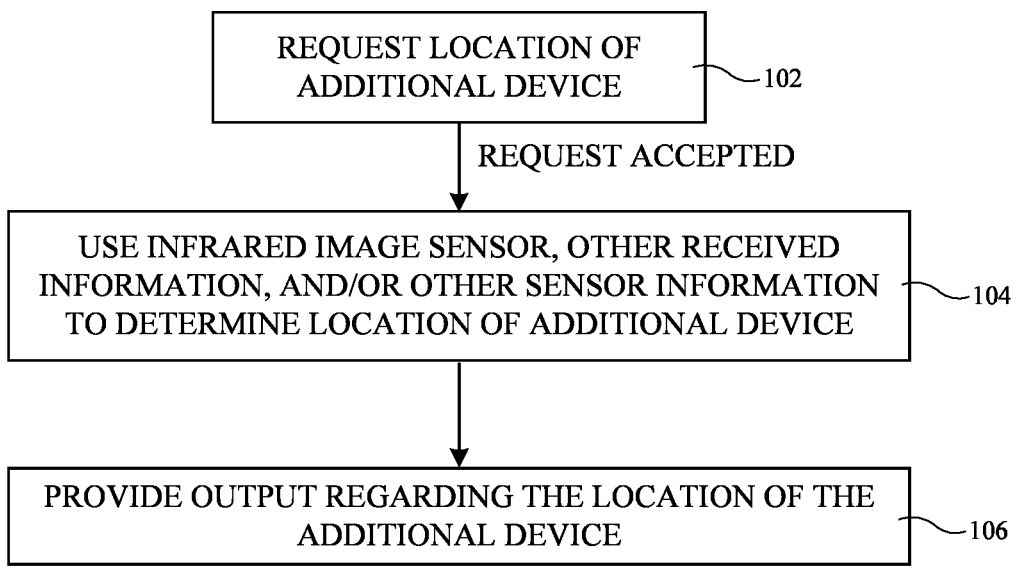
FIG. 5 is a flowchart of illustrative method steps for operating an electronic device that locates an infrared beacon in an additional electronic device in accordance with an embodiment.

FIG. 5 is a flowchart of illustrative method steps for operating an electronic device (e.g., device 10A in FIG. 4) that is used to locate an infrared beacon in the device's surroundings. First, at step 102, a user may request the location of an additional electronic device (e.g., device 10B). Device 10A may transmit a location-sharing request (or an infrared beacon request) using wireless communication circuitry 38 (see FIG. 1), as one example. The device may transmit the location-sharing request to the additional electronic device based on input from a user of the electronic device. For example, the user may send a request to a contact to share the contact's location (e.g., using touch input on a touch-sensitive display, using a voice command, etc.).

When the request for location-sharing (or the infrared beacon request) is accepted by device 10B, device 10A may proceed to step 104. During step 104, device 10A uses at least an infrared image sensor (e.g., time-of-flight sensor 34 in FIG. 1) to determine the location of additional electronic device 10B.

In some cases, a dedicated outward-facing infrared image sensor with an array of infrared-sensitive imaging pixels may be included in device 10A. In this type of arrangement, one or more images may be captured by the outward-facing infrared image sensor to identify the location of infrared light emitted by device 10B.

In the example of FIG. 1, device 10A uses time-of-flight sensor 34 from LiDAR module 30 to identify the location of infrared light emitted by device 10B. Time-of-flight sensor 34 points in the same direction as outward-facing image sensor 40 and may optionally have approximately the same field-of-view as outward-facing image sensor 40. As previously noted, time-of-flight sensor 34 may have fewer readout circuits than pixels. Each frame of data may therefore include information from only a subset of the pixels in the time-of-flight sensor. In one example, frames of image data (scans) may be obtained using time-of-flight sensor 34 until all of the pixels in the sensor have been scanned. As an example, 45 scans of 500 pixels each may be performed to obtain image data from all of the pixels (22,500 pixels) in sensor 34. This type of imaging scheme may provide the highest resolution for the time-of-flight sensor but may take a longer duration of time than desired. The infrared beacon may sometimes be detected by time-of-flight sensor 34 using a smaller number of scans (e.g., less than 45, less than 35, less than 25, etc.). The resolution in this scenario is lower than if the full number of scans is performed. However, the resolution may be sufficient to detect the infrared beacon and therefore the extraneous frames are omitted. When searching for the infrared beacon, time-of-flight sensor 34 may perform a fixed number of scans (e.g., a full number of scans for complete imaging or less than the full number of scans) or may perform scans until the infrared beacon has been detected (e.g., above a certain degree of certainty).

Additional image processing (e.g., frame registration for motion compensation, ambient light compensation to remove ambient infrared light, etc.) may be performed by control circuitry 16 within device 10 to determine the location of the infrared beacon and/or correlate the location of the infrared beacon (as determined by time-of-flight sensor 34) to a physical location on display 14 and/or other output indicative of the location of the infrared beacon.

Additional image processing may also be performed at step 104 to identify an encoded modulation in the infrared beacon. The infrared light emitted by device 10B may be modulated to improve the infrared beacon performance in certain circumstances. For example, in some settings ambient infrared light may cause a false positive in device 10A looking for device 10B (e.g., device 10A identifies the location of device 10B based on detected infrared light when the detected infrared light is in fact ambient infrared light and not infrared light emitted by device 10B). As another example, if multiple devices in proximity are emitting infrared beacons at the same time, device 10A may not be able to distinguish which infrared beacon is from the electronic device of interest (e.g., device 10B). Modulating the infrared light in device 10B according to a unique code mitigates these issues. Device 10A only positively identifies device 10B when the detected infrared light has the unique modulation scheme. This allows for discrimination between the IR beacon of interest (from device 10B), ambient infrared light, and other IR beacons in the field-of-view (from other electronic devices other than device 10B).

To achieve the aforementioned unique modulation scheme, device 10B may modulate the wavelength and/or intensity of the emitted infrared light. The infrared light may be turned on and off at a given frequency, as one example. Device 10A may be informed of the modulation scheme used by device 10B (so that device 10A can identify the modulation scheme). As one example, device 10A may provide instructions to device 10B at step 102 to use a given modulation scheme if the request is accepted and the infrared beacon is initiated. Device 10A then looks for the assigned modulation scheme at step 104. As another example, device 10B may select a modulation scheme after accepting the location-sharing request and transmit the modulation scheme back to device 10A using wireless communication circuitry 38. Device 10A then looks for the assigned modulation scheme at step 104.

It should be noted that the example of device 10A using an outward-facing infrared image sensor (such as time-of-flight sensor 34) to detect the infrared beacon is merely illustrative. If desired, the user may flip the orientation of the device and point an inward-facing infrared image sensor towards the infrared beacon, thus using the inward-facing infrared image sensor to detect the infrared beacon. It should also be noted that the outward-facing sensor in device 10A may be an infrared image sensor rather than a time-of-flight sensor. The image sensor may be part of a head-mounted device rather than a handheld device. Device 10B may also be part of a head-mounted device and may use a light source in a LiDAR module to emit infrared light, which is then detected by device 10A. In other words, in certain applications, light source 32 of LiDAR module 30 may serve as an infrared beacon for location sharing.

In addition to capturing images with an infrared image sensor to determine the location of the additional electronic device, device 10A may receive additional information from device 10B and/or may obtain other sensor information at step 104. For example, device 10A may receive GPS location information from device 10B at step 104 (e.g., using wireless communication circuitry 38). In some settings (e.g., indoors), the GPS location information is not on its own sufficient for the user of device 10A to easily find device 10B (hence the use of the infrared beacon). However, the GPS location information may still be used in addition to the IR beacon in the friend-finding process. For example, the GPS location may be used by the user of device 10A to know the general area to point their camera to obtain images for the IR beacon technique.

As another example, UWB communications may be used to determine the location of the additional device in step 104. For example, devices 10A and 10B may exchange wireless time stamped messages in one or more UWB frequency bands using wireless communication circuitry 38. Time stamps in the messages may be analyzed to determine the time of flight of the messages and thereby determine the distance (range) between the devices and/or an angle between the devices (e.g., an angle of arrival of incoming radio-frequency signals). Information from the UWB communications may be used by device 10A to determine the location of device 10B.

UWB communications for location determination may be performed instead or in parallel to the infrared beacon operations for location determination. In some circumstances, UWB communications for location determination may be preferred to using infrared beacons. For example, if the light emitted by the infrared beacon on device 10B is completely blocked from reaching the infrared image sensor in device 10A (e.g., if device 10B is in a user's pocket, if device 10B is covered by a user's sleeve, if device 10B is placed in a user's closed bag, etc.), the infrared beacon may not be useful for device 10A to find device 10B. In this situation, it is helpful to use UWB communications for location determination. In other circumstances, using infrared beacons for location determination may be preferred to UWB communications. For example, UWB communications may not be as effective when device 10B is moving. In this situation, it is helpful to use infrared beacons for location determination. Device 10A may attempt to find device 10B using both infrared beacons and UWB communications in parallel. Alternatively, device 10A may attempt to find device 10B using one of the techniques and revert to the other technique if the first technique is unsuccessful.

Information from other sensors in device 10A may also be used in determining the location of additional device 10B.

For example, information from infrared point sensor 36 may be used in determining the location of device 10B. Infrared point sensor 36 may be used to determine ambient infrared light conditions, detect an infrared light modulation frequency from the infrared beacon, etc. Devices 10A and/or 10B may also use a visible image sensor (e.g., part of a camera assembly) to take a photograph of its surroundings. These photographs may be processed by device 10A to determine the location of device 10B.

The aforementioned examples of information that is used to determine the location of the additional electronic device at step 104 are merely illustrative. In general, any desired additional information may be used (e.g., information from other sensors such as an accelerometer, information received using wireless communications circuitry such as information at Wi-Fi frequencies, etc.).

After determining the location of the additional electronic device at step 104, device 10A may provide output regarding the location of the additional electronic device at step 106. Device 10A may provide a wide variety of output to identify the location of the additional electronic device. The output may include visual output (e.g., provided using display 14), audio output (e.g., provided using speakers 20), and/or haptic output (e.g., provided using haptic output devices 18). The output may be provided by device 10A directly or by another device in communication with device 10A (e.g., an electronic watch paired with device 10A).

Visual output regarding the location of the additional electronic device may include augmentations to an image of the user's surroundings such as augmentation 54 in FIG. 4. As previously mentioned, display 14 may be used to display an image of the user's surroundings (as captured in real time by outward-facing image sensor 40). In some cases, infrared image data captured by the infrared image sensor (e.g., time-of-flight sensor 34) may be combined with display data for the image of the user's surroundings to present an augmented image. For example, the infrared image sensor captures image data that includes a plurality of brightness values for respective pixels. The image of the user's surroundings that is displayed on the display also includes a plurality of brightness values for respective pixels. The brightness values from the infrared image sensor may be added directly to the corresponding brightness values for the display to form the augmented image that is then displayed on display 14. In the augmented image, areas with higher detected infrared brightness appear brighter due to the increased intensity of light in those areas. For example, a first pixel corresponding to a first location in the scene may have an initial gray scale level of 150 (based only on data from outward-facing image sensor 40) while a second pixel corresponding to a second location in the scene may have an initial gray scale level of 150 (based only on data from outward-facing image sensor 40). The infrared image sensor may determine that the intensity of infrared light at the first location in the scene is brighter than the intensity of infrared light at second first location in the scene. After augmentation, the first pixel corresponding to the first location in the scene may have an augmented gray scale level of 200 while the second pixel corresponding to the second location in the scene may have an augmented gray scale level of 150. This example is merely illustrative. In general, any desired processing may be performed to augment the image of the user's surroundings based on the information from the infrared image sensor. In additional examples, the image from the outward-facing image sensor 40 may be initially dimmed before being augmented by the infrared light data to highlight the location of the infrared beacon.

The example of applying brightness values from the infrared image sensor to the brightness values from the outward-facing image sensor to determine an augmented image is merely illustrative. As another example, the images captured by the infrared image sensor may be used to determine the relative location of the infrared beacon in the user's surroundings. The determined location may then be highlighted in the image of the user's surroundings (from sensor 40) using any desired augmentation. As one example, a visual indicator may be overlayed on the image of the user's surroundings to identify the position of the additional electronic device. For example, a circle may be overlaid on the location of the additional electronic device on the image of the user's surroundings (with the center of the circle overlapping the location of the additional electronic device). As another example, one or more arrows that point to the location of the additional electronic device may be overlaid on the image of the user's surroundings. As yet another example, a circular patch at the location of the additional electronic device may be increased in brightness or maintained in brightness while the remaining portion of the image is dimmed or blacked out entirely. This creates a spotlight effect where a circular spotlight is maintained on the location of the additional electronic device (at the infrared beacon).

As yet another example, instead of displaying a real-time image from outward-facing image sensor 40 (e.g., a pass-through image), display 14 may display an arrow that points to the location of the additional electronic device. An estimated distance to the additional electronic device may optionally be displayed along side the arrow. The direction of the arrow and/or distance may be updated in real time as the user moves towards additional electronic device 10B and/or pans device 10A. The estimated distance to the additional electronic device may be determined based on GPS, and/or UWB information. Instead or in addition, the estimated distance to the additional electronic device may be determined using the depth mapping functionality of LiDAR module 30. Instead or in addition, the estimated distance to the additional electronic device may be determined using a machine learning algorithm that analyzes images from outward-facing image sensor 40 and/or data from time-of-flight sensor 34. For example, the machine learning algorithm may store approximate dimensions of certain objects (e.g., cars, people, etc.) that are used as reference points to estimate the distance between the location of device 10B and device 10A.

Instead of or in addition to providing visual output using device 10A, device 10A may provide visual output using another electronic device that is paired to device 10B. For example, device 10A may be a cellular telephone that is paired to an electronic watch using wireless communications circuitry 38. Device 10A may send information to the electronic watch that the electronic watch uses to provide visual output regarding the location of device 10B. As one possible example, display 14 on device 10A may be used to display an image of the user's surroundings with an augmentation 54 that highlights the location of device 10B. At the same time, the electronic watch may display an arrow that points to the location of the additional electronic device. An estimated distance to the additional electronic device may optionally be displayed alongside the arrow. The direction of the arrow may be updated in real time as the user moves towards additional electronic device 10B and/or moves their wrist.

Instead of or in addition to providing visual output, device 10A may provide haptic feedback and/or audio feedback. For example, device 10A may vibrate when device 10B enters the field-of-view of device 10A and/or is centered in the field-of-view of device 10A. This may serve as an alert to the user that they are facing the correct direction. As another example, device 10A may provide audio feedback using speakers 20. The audio feedback may include verbal instructions regarding the location of device 10B or a chime when device 10B enters the field-of-view of device 10A and/or is centered in the field-of-view of device 10A. In one example, spatial audio may be provided by device 10A that imitates a sound that is coming from the determined location of device 10B. The user of device 10A may then walk towards the apparent location of the sound to find device 10B. The audio feedback may optionally be provided with a wireless or wired audio accessory (e.g., earbuds, headphones, etc.) that is connected to device 10A (e.g., a wired connection through a physical port or a wireless connection using wireless communication circuitry 38).

Any other desired output regarding the location of the additional electronic device may be provided at step 106.

Figure 6:
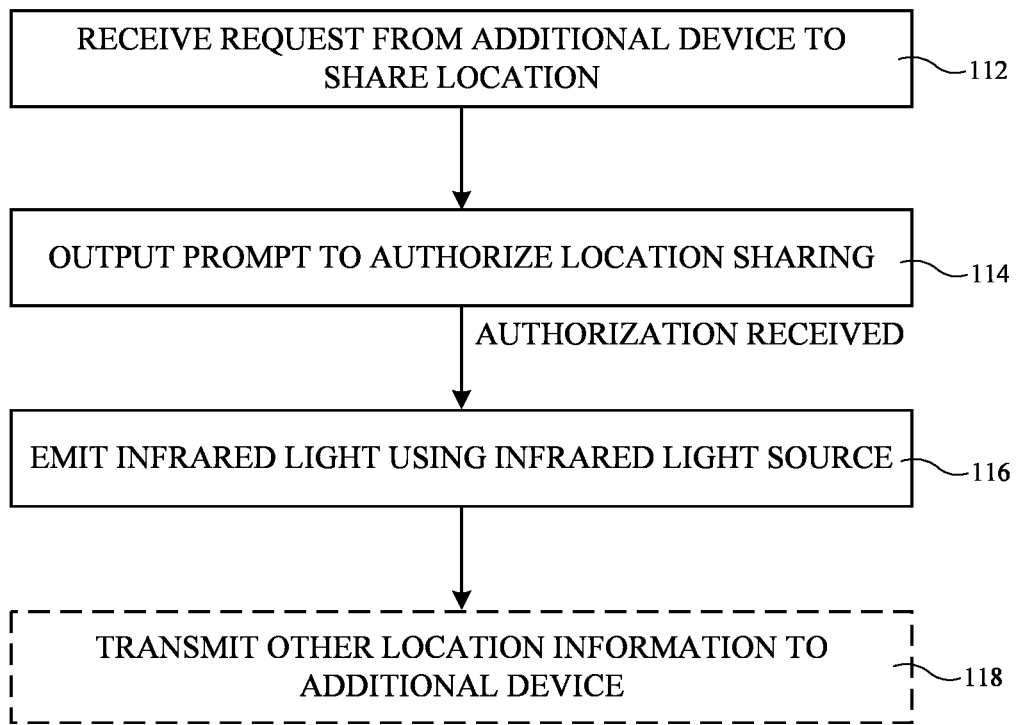
FIG. 6 is a flowchart of illustrative method steps for operating an electronic device that emits infrared light for location sharing in accordance with an embodiment.

FIG. 6 is a flowchart of illustrative method steps for operating an electronic device (e.g., device 10B in FIG. 4) that is used to emit an infrared beacon for location sharing purposes. First, at step 112, device 10B may receive a request from an additional electronic device (device 10A) to share device 10B's location (or emit an infrared beacon). Device 10B may receive the request using wireless communication circuitry 38.

At step 114, in response to receiving the location-sharing request from device 10A, device 10B outputs a prompt to authorize location sharing (or authorize the initiation of the infrared beacon). Device 10B may output the prompt using visual, audio, and/or haptic output. For example, the prompt may be displayed on display 14 and accepted by the user providing touch input to the display. As another example, the prompt may be provided by audio (e.g., using speakers 20) and may be accepted by the user providing a voice command.

It should be noted that, if desired, a user may preemptively authorize location sharing. The user may authorize location sharing with specific devices or from known users. For example, the user may authorize location sharing with all of their contacts, with a subset of their contacts, with specific contacts on a case-by-case basis, with a specific external device, etc. When a request for location sharing from a pre-approved contact (e.g., from any device that is known to belong to the contact) or device is received at step 112, step 114 may be omitted and the device may skip directly to step 116.

After authorization for location sharing is received (e.g., an authorization in response to the authorization prompt output at step 114, an automatic authorization in response to the request at step 112 coming from a pre-approved user or device, etc.), device 10B proceeds to step 116. At step 116, device 10B may emit infrared light using an infrared light source. The infrared light source may be flood illuminator 24 for face recognition module 22 in FIG. 1, as an example. Alternatively, device 10B may include a dedicated infrared light source for location sharing. Also at step 116, device 10B may transmit (e.g., using wireless communication circuitry 38) a notification to device 10A that the location sharing (infrared beacon) has been authorized.

When the user authorizes the location sharing, the infrared light source may be activated at step 116 for a predetermined period of time (e.g., 30 seconds, 1 minute, at least 30 seconds, at least 1 minute, at least 3 minutes, less than 3 minutes, less than 10 minutes, etc.). Turning off the infrared light source after this predetermined duration may preserve battery in device 10B. The infrared light source may remain on until the predetermined duration expires, until device 10A is within a predetermined distance of device 10B (e.g., device 10A is within a few feet of device 10B and it is assumed the infrared beacon is no longer needed), or until a user manually turns off the infrared beacon.

If desired, light may be emitted from infrared light source according to a modulation scheme at step 116. As previously discussed, the infrared light emitted by device 10B may be modulated to improve the infrared beacon performance in certain circumstances (e.g., by allowing for discrimination between the IR beacon of interest, ambient infrared light, and other IR beacons in the field-of-view of device 10A). During step 116, device 10B may modulate the wavelength and/or intensity of the emitted infrared light. The infrared light may be turned on and off at a given frequency, as one example. Between steps 114 and 116, device 10B may receive instructions from device 10A to use a given modulation scheme. Alternatively, device 10B may select a modulation scheme at step 116 after accepting the location-sharing request and transmit the modulation scheme back to device 10A using wireless communication circuitry 38. Device 10A then looks for the assigned modulation scheme (e.g., at step 104 in FIG. 5).

In FIG. 6, the user authorizes the location sharing using input-components of device 10B and then infrared light is emitted using an infrared light source in device 10B. This example is merely illustrative. At step 116, infrared light may instead or in addition be emitted from an infrared light source in an electronic device that is paired to device 10B. For example, device 10B may be paired with another electronic device (e.g., an electronic watch, a head-mounted device, etc.) that has an infrared light source. That infrared light source and the infrared light source in device 10B may both emit light according to the determined modulation scheme to increase the strength of the infrared beacon.

Device 10B may optionally transmit additional information to additional device 10A at step 118. The additional information may help device 10A determine the location of device 10B. For example, device 10B may transmit GPS location information to device 10A at step 118 (e.g., using wireless communication circuitry 38). In some settings (e.g., indoors), the GPS location information is not on its own sufficient for the user of device 10A to easily find device 10B (hence the use of the infrared beacon). However, the GPS location information may still be used in addition to the IR beacon in the friend-finding process. For example, the GPS location may be used by the user of device 10A to know the general area to point their camera to obtain images for the aforementioned IR beacon technique. As another example, UWB communications may be transmitted and/or received by device 10B at step 118, as described above in connection with FIG. 5.

Figure 7:
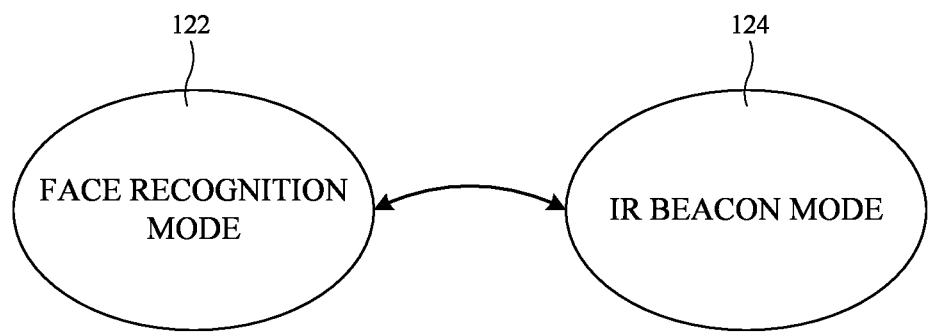
FIG. 7 is a state diagram of an illustrative infrared light source in an electronic device in accordance with an embodiment.

FIG. 7 is a state diagram showing illustrative operating modes for flood illuminator 24 in device 10. As shown, the flood illuminator is operable in a face recognition mode 122 and an infrared beacon mode 124. In both modes 122 and 124, the flood illuminator may be turned on to emit infrared light. In face recognition mode 122, the inward-facing image sensor 28 may also be activated to capture images of a user's face (that is illuminated by flood illuminator 24). In infrared beacon mode 124, inward-facing image sensor 28 does not capture images (e.g., is inactive) as face recognition is not being performed.

The flood illuminator may be modulated in IR beacon mode 124 as previously discussed in connection with FIGS. 5 and 6. In contrast, the flood illuminator may not be modulated in face recognition mode 122. Regardless of whether modulation is performed in IR beacon mode 124, the brightness of the flood illuminator may also be different in mode 124 than in mode 122. For example, the brightness in mode 124 may be greater than in mode 122. Operating the flood illuminator with a high brightness in mode 124 may help the device be detected by an additional electronic device (e.g., device 10A in FIG. 4). In face recognition mode 122, the brightness may not need to be as high and is therefore lower to conserve battery.

Figure 8:
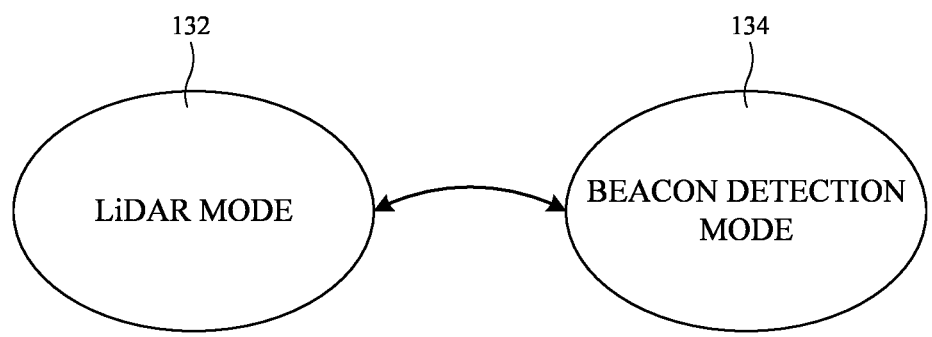
FIG. 8 is a state diagram of an illustrative time-of-flight sensor in an electronic device in accordance with an embodiment.

FIG. 8 is a state diagram showing illustrative operating modes for time-of-flight sensor 34 in device 10. As shown, the time-of-flight sensor 34 is operable in a LiDAR mode 132 and a beacon detection mode 134. In both modes 132 and 134, the time-of-flight sensor 34 may output image data. However, in mode 132, the time-of-flight sensor may operate in a time-of-flight mode where time-of-flight output is used for depth mapping in LiDAR module 30. In beacon detection mode 134, the pixels in the time-of-flight sensor may be scanned to detect the location of an infrared light source.

While time-of-flight sensor 34 is in LiDAR mode 132, the light source 32 of LiDAR module 30 emits light. Reflections of this light is detected by time-of-flight sensor 34 for depth mapping. While time-of-flight sensor 34 is in beacon detection mode 134, however, light source 32 remains off (because depth mapping is not performed).

In general, the components and functionality of either IR beacon emission (e.g., device 10B as described in FIG. 6) or IR beacon detection (e.g., device 10A as described in FIG. 5) may be incorporated into any desired type of electronic device. The IR beacon emission components and functionality may be incorporated into a cellular telephone, a table computer, an electronic watch, a head-mounted device, an embedded system in a car, an embedded system in another type of device/system, etc. Similarly, the IR beacon detection components and functionality may be incorporated into a cellular telephone, a table computer, an electronic watch, a head-mounted device, an embedded system in a car, an embedded system in another type of device/system, etc.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device comprising:
    an infrared light source that is configured to emit infrared light;
    an infrared image sensor that is configured to capture the infrared light emitted by the infrared light source;
    wireless communications circuitry configured to receive a wireless communication comprising a location-sharing request from an additional electronic device, wherein the infrared light source is configured to emit infrared light in response to receiving the wireless communication; and
    an output device that is configured to output a prompt to authorize location sharing in response to receiving the location-sharing request, wherein the infrared light source emits the infrared light in response to the prompt to authorize location sharing being accepted.

2. The electronic device defined in claim 1, wherein the electronic device has a front face, the electronic device further comprising:
    a display on the front face, wherein the infrared light source and the infrared image sensor are positioned on the front face, and wherein the infrared light source and the infrared image sensor are part of a face recognition module.

3. The electronic device defined in claim 2, wherein the infrared light source is placed in an infrared beacon mode in accordance with receiving the wireless communication, wherein the infrared light source modulates the emitted infrared light in the infrared beacon mode, and wherein the infrared light source is operable in a face recognition mode in which the emitted infrared light is not modulated.

4. The electronic device defined in claim 1, wherein the wireless communications circuitry is configured to transmit Global Positioning System (GPS) location information to the additional electronic device in accordance with receiving the wireless communication.

5. An electronic device comprising:
    an infrared light source that is configured to emit infrared light; and
    wireless communications circuitry that is configured to receive a wireless communication from an additional electronic device, wherein the wireless communication is a request to authorize location sharing and wherein the infrared light source is turned on in response to the wireless communications circuitry receiving the request to authorize location sharing.

6. The electronic device defined in claim 5, further comprising:
    an output device configured to, in response to the wireless communications circuitry receiving the request to authorize location sharing, output a prompt for authorizing location sharing with the additional electronic device, wherein the infrared light source is turned on in accordance with the prompt for authorizing location sharing with the additional electronic device being accepted.

7. The electronic device defined in claim 5, wherein the infrared light source is configured to modulate the infrared light when the infrared light source is turned on.

8. The electronic device defined in claim 5, wherein the wireless communications circuitry is configured to transmit Global Positioning System (GPS) location information to the additional electronic device in accordance with the wireless communications circuitry receiving the request to authorize location sharing.

9. The electronic device defined in claim 5, wherein the wireless communications circuitry is configured to exchange ultra-wideband (UWB) communications with the additional electronic device in accordance with the wireless communications circuitry receiving the request to authorize location sharing.

10. An electronic device comprising:
    wireless communications circuitry configured to transmit a location-sharing request to an additional electronic device and receive a transmission from the additional electronic device indicating that the location-sharing request was accepted; and
    a light detection and ranging (LiDAR) module that includes an infrared light source and an infrared image sensor, wherein the infrared image sensor is configured to obtain infrared image data in response to the wireless communications circuitry receiving the transmission from the additional electronic device indicating that the location-sharing request was accepted.

11. The electronic device defined in claim 10, wherein the infrared image sensor is placed in a beacon detection mode in accordance with the wireless communications circuitry receiving the transmission from the additional electronic device indicating that the location-sharing request was accepted, wherein the infrared light source is inactive while the infrared image sensor is in the beacon detection mode, and wherein the infrared image sensor is operable in a LiDAR mode in which the infrared image sensor senses infrared light emitted by the infrared light source.

12. The electronic device defined in claim 10, further comprising:
    an output device that is configured to output information regarding a location of the additional electronic device based on the infrared image data from the infrared image sensor.

13. The electronic device defined in claim 12, wherein the electronic device further comprises:
    a visible light image sensor; and
    a display configured to display images captured by the visible light image sensor, wherein outputting information regarding the location of the additional electronic device comprises using the display to display an augmentation of the images captured by the visible light image.

14. The electronic device defined in claim 13, wherein the augmentation comprises a visual indicator identifying the location of the additional electronic device.

15. The electronic device defined in claim 13, wherein the augmentation comprises an increased brightness at the location of the additional electronic device.

16. An electronic device comprising:
    wireless communications circuitry configured to transmit a location-sharing request to an additional electronic device and receive a transmission from the additional electronic device indicating that the location-sharing request was accepted;
    an infrared image sensor that is configured to obtain infrared image data in response to the wireless communications circuitry receiving the transmission from the additional electronic device indicating that the location-sharing request was accepted; and an output device that is configured to output information regarding a location of the additional electronic device based on the infrared image data from the infrared image sensor.

17. The electronic device defined in claim 16, wherein the wireless communications circuitry is configured to receive Global Positioning System (GPS) location information from the additional electronic device and wherein the output device is configured to output information regarding the location of the additional electronic device based on the infrared image data from the infrared image sensor and the received GPS location information.

18. The electronic device defined in claim 16, wherein the wireless communications circuitry is configured to exchange ultra-wideband (UWB) communications with the additional electronic device in accordance with the wireless communications circuitry receiving the transmission from the additional electronic device indicating that the location-sharing request was accepted.

19. The electronic device defined in claim 16, wherein the output device is a speaker that is configured to provide audio information regarding the location of the additional electronic device.

* * * * *